J. A. STAPLES.
FOOT OPERATED CONTROL DEVICE FOR AUTOMOBILES AND THE LIKE.
APPLICATION FILED FEB. 9, 1914.

1,110,970.

Patented Sept. 15, 1914.
3 SHEETS—SHEET 1.

Witnesses:

Inventor
John A. Staples
By his Attorneys

J. A. STAPLES.
FOOT OPERATED CONTROL DEVICE FOR AUTOMOBILES AND THE LIKE.
APPLICATION FILED FEB. 9, 1914.
1,110,970.
Patented Sept. 15, 1914.
3 SHEETS—SHEET 2.
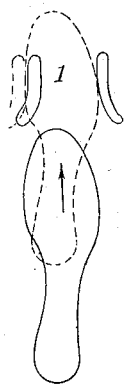
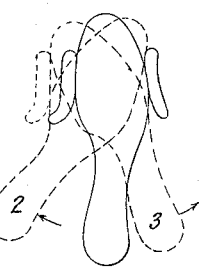
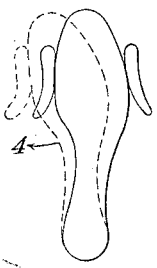
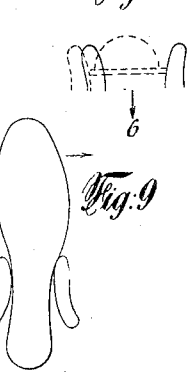
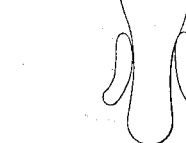
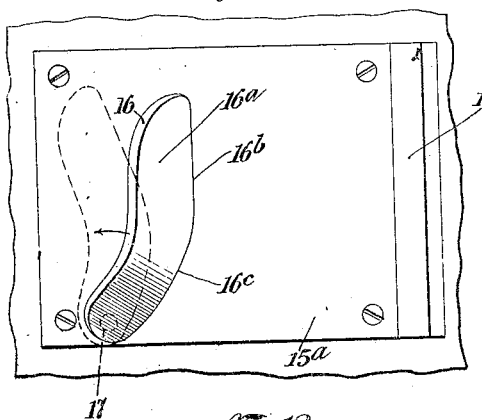
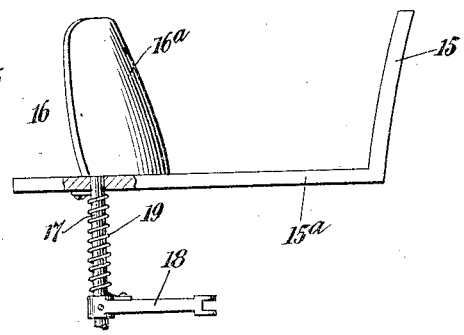
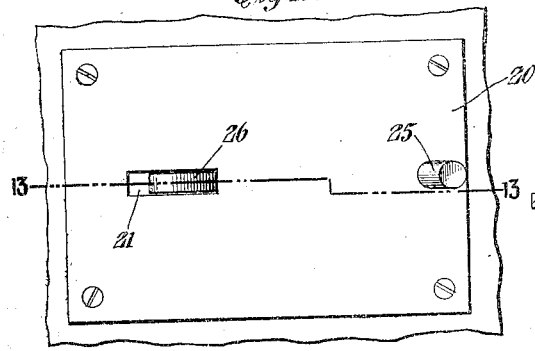
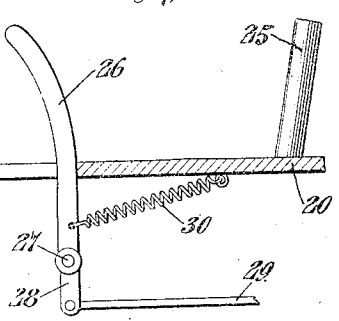
Witnesses:
Staples
Inventor
Attorneys J. A. STAPLES.
FOOT OPERATED CONTROL DEVICE FOR AUTOMOBILES AND THE LIKE.
APPLICATION FILED FEB. 9, 1914.
1,110,970.
Patented Sept. 15, 1914.
3 SHEETS—SHEET 3.
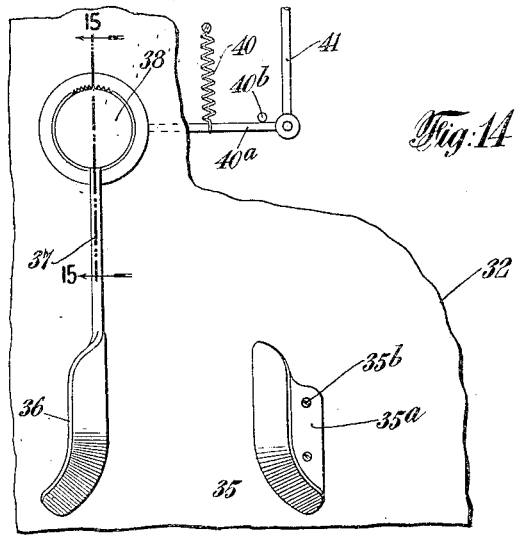
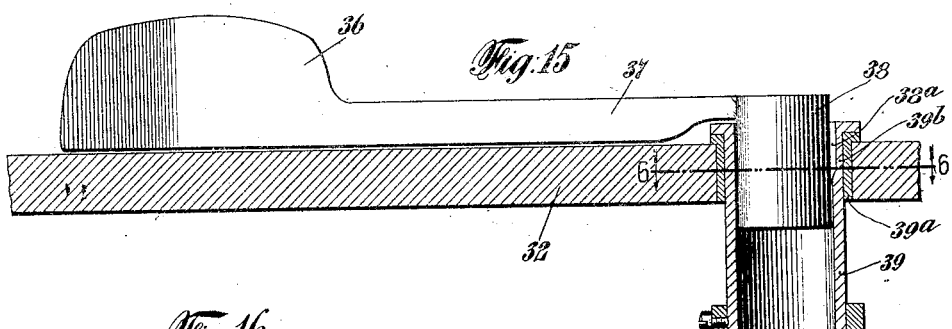
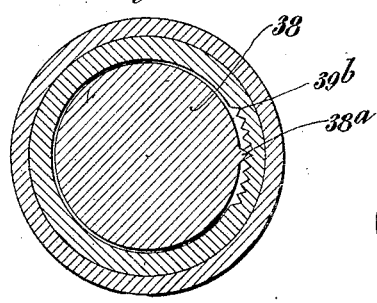
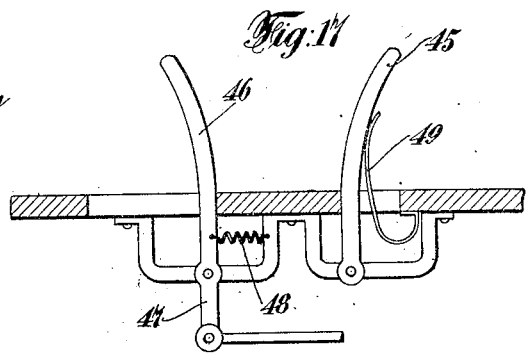
Witnesses:
John A. Staples, Inventor
By his Attorneys

UNITED STATES PATENT OFFICE.

JOHN ATKINSON STAPLES, OF NEWBURGH, NEW YORK.

FOOT-OPERATED CONTROL DEVICE FOR AUTOMOBILES AND THE LIKE.

1,110,970.

Specification of Letters Patent.  Patented Sept. 15, 1914.

Application filed February 9, 1914. Serial No. 817,435.

*To all whom it may concern:*

Be it known that I, JOHN A. STAPLES, a citizen of the United States, residing at Newburgh, in the county of Orange and State of New York, have invented certain new and useful Improvements in Foot-Operated Control Devices for Automobiles and the like; and I do hereby declare the following to be a full, clear, and exact description of the invention, such as will enable others skilled in the art to which it appertains to make and use the same.

My invention consists in the novel features hereinafter described, reference being had to the accompanying drawings in which I have shown the preferred embodiment of my invention and several modifications thereof, selected by me for purposes of illustration, and the said invention is fully disclosed in the following description and claims.

Figure 1:
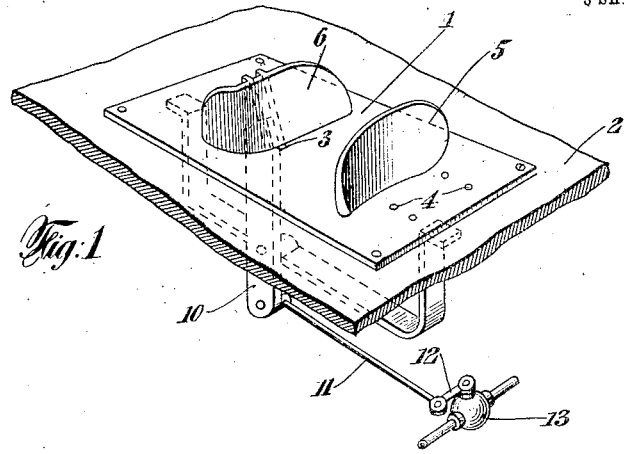
Figure 2:
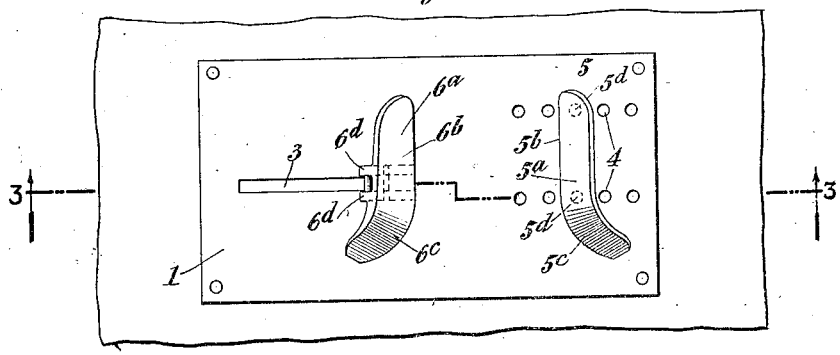
Figure 3:
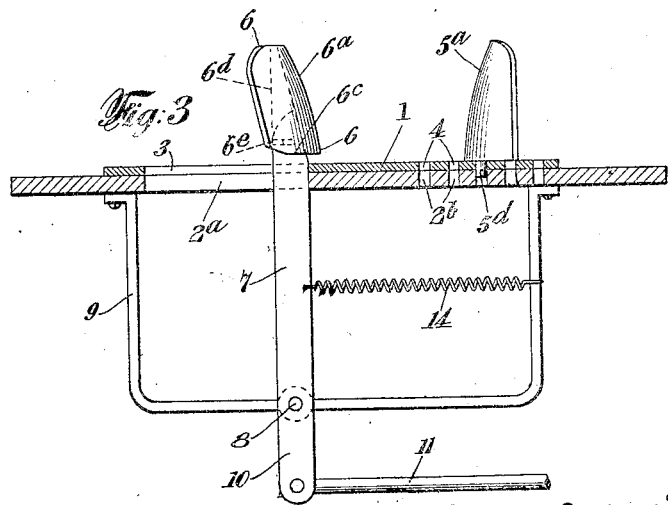

In the said drawings, Figure 1 is a perspective view partly in section of an embodiment of my invention in its preferred form adapted for use as an accelerator for controlling the feed of explosive material to the motor of an automobile. Fig. 2 is a top plan view of the same. Fig. 3 is a vertical sectional view of the device on the line 3—3 of Fig. 2, the foot engaging parts above the base plate or foot board being shown in elevation. Figs. 4 to 9 inclusive are diagrammatic views illustrating various positions of the foot in operating the device. Fig. 10 is a top plan view illustrating a modified form of my invention. Fig. 11 is an elevation of the same, parts being indicated in section. Fig. 12 is a top plan view of another modification of my invention. Fig. 13 is a vertical section on line 13—13 of Fig. 12. Figs. 14, 15, and 16 are detail views representing another slight modification of my invention. Fig. 17 is a detail view of another slight modification.

In the use of vehicles driven by prime motors, it is very desirable that the control of the motor as to variations of speed may be effected by the foot of the driver in order that his hands may be left free to operate the steering wheel and the change speed lever or levers. It is therefore usual to provide in automobiles a foot operated device connected with a suitable valve for controlling the supply of explosive mixture to the engine or connected to the appropriate devices for controlling the speed of the motor. These devices are usually termed accelerators, and the foot operated portion thereof is ordinarily moved by the foot against the action of a spring which is employed to return the device to its normal position. In devices of this kind, in common use, it has been necessary to maintain the foot in a more or less uncomfortable position and to keep the muscles of the foot and leg in a state of constant tension against the action of the returning spring of the accelerator, the resistance of which increases the further the accelerator is depressed, both of which facts involve a continuous strain on the foot and leg which in the course of continuous driving for long periods becomes tiresome and painful. The foot also must usually be maintained in a more or less unstable position so that the jarring of the vehicle is apt to impart accidental movements to the foot which materially interfere with the uniformity and accuracy of the motor control.

I have given very careful consideration to this subject, and by a long series of experiments, I have found that a satisfactory device of this character must obviate all of the difficulties heretofore mentioned and provide for nicety and accuracy of adjustment, perfect steadiness of the control device under all road conditions so as to retain any desired adjustment without accidental change, while permitting the foot to be maintained in a comfortable position and without strain or stress upon the muscles of the foot or leg. I have also found that in addition to these important considerations, a satisfactory accelerator must further permit of instant operation whether the foot is in contact with the device or, as is often the case, is located on a foot brake or some part of the flooring, and the device must also, for commercial reasons, present a wide variety of positions of the foot in operating the same to accommodate the habits or convenience of different drivers.

My invention therefore consists of a simple and effective device adapted to be located on the foot board of an automobile and so constructed and arranged as to be capable of operation by the foot in at least seven different ways, capable of instantaneous operation by the foot under any and all conditions, and which under ordinary conditions of operation permits the foot to be supported in a condition of ease and rest and without any stress on the muscles of the foot or leg. This insures ease and comfort in driving, as the foot is relieved from the necessity of continually opposing the retracting spring with which the device is provided and the variety of positions in which the foot may be placed and effectively engage the device, affords the operator an opportunity to frequently change the position of his foot which is a great relief, especially in driving long distances. To this end, therefore, my invention comprises essentially a stationary member and a movable member between which the foot is inserted with a wedging action so as to separate said members more or less. The movable member may be pivoted upon either a horizontal or a vertical pivot and the opposing faces of said members are preferably inclined to each other either vertically or horizontally or both so that the wedging action referred to may be accomplished in various ways, and the stationary member is also preferably adjustable with respect to the movable member in order that the device may be quickly and readily adjusted to accommodate different widths of shoe worn by the driver, so as to secure uniformity of results in all cases.

In Figs. 1, 2, and 3, I have shown the preferred embodiment of my invention, which consists of the following instrumentalities.

1 represents a base plate which is secured on a suitable support, as a floor board 2 of an automobile, in such position as to be within comfortable reach of the foot when the operator is seated. The plate 1 is preferably provided with a slot 3 at one side of the same, and at the other side it is provided in this instance with a plurality of adjusting apertures 4.

5 represents the stationary foot engaging member, the inner face $5^a$ of which has a forward part of its lower edge, indicated at $5^b$, extending in a direction longitudinally of the machine and substantially straight, the rear portion of said lower edge being inclined or curved laterally and outwardly therefrom, as indicated at $5^c$. The whole extent of the inner face is inclined outwardly from the bottom to the top thereof, as clearly shown in Fig. 3. The stationary member 5 is adjustably connected to the plate 1 or the floor board in any desired manner so as to permit of lateral adjustment of the entire member with respect to the movable member hereinafter described, and in this instance, I have shown the stationary member 5 provided with dowel pins $5^d$, see Fig. 3, to engage pairs of the adjusting apertures 4, as indicated in Figs. 2 and 3, to secure the desired space between the stationary member and the movable member to accommodate the shoe of the driver.

6 represents the movable member which is constructed substantially like the stationary member, that is to say, its inner face $6^a$ is provided with the straight portion at its lower edge, as indicated at $6^b$, and the outwardly curved rear portion at its lower edge, as indicated at $6^c$, the whole face $6^a$ being inclined upwardly and outwardly from said lower edge. The movable member in this instance is detachably secured to the upper end of an operating lever 7 which is mounted on a horizontal pivot 8 suitably supported below the base board 2, in this instance, in strap or bracket 9, as shown in Fig. 3, the said lever 7 being connected in any suitable manner with the valve or other control mechanism to be operated for the control of the motor. In this instance, the lever 7 is provided with an operating arm 10 connected by a link 11 with an arm 12 connected with a suitable butterfly or other valve 13, for supplying explosive mixture to the motor, as indicated in Fig. 1.

Obviously the specific form of connections between the movable member and the valve or other device to be controlled may be varied in accordance with the circumstances of the particular automobile or other apparatus with which the control device is used. The movable member 6 is preferably provided with guiding portions $6^d$, to engage the upper end of the lever 7 and is adapted to be secured thereto by a cotter pin $6^e$, as shown in Figs. 2 and 3, so as to permit it to be quickly removed if it should be necessary to lift the floor board. The lever 7 extends upwardly through the slot 3 in the plate 1 and the floor board 2 is provided with a corresponding slot $2^a$ and with apertures $2^b$ registering with the adjustment holes 4 of the base plate 1.

I prefer to provide a suitable retracting spring 14 for holding the movable member in its innermost position and for returning it and the apparatus connected therewith to normal position after any movement thereof, and in the embodiment of the invention herein shown in Figs. 1, 2, and 3, I have shown the spring 14 connected to lever 7 at one end and at the other end to the strap or bracket 9, but obviously the spring may be connected in any desired way, and either an expansion or contraction spring may be employed for this purpose.

Figs. 4 to 9 illustrate diagrammatically various ways in which this control device can be used, and show the different positions of the foot with respect to the stationary and movable members. Thus it will be seen that if the foot is thrown forward, as indicated in Fig. 4, the sole portion thereof will engage rearwardly flared portions $5^c$ and $6^c$ of the stationary and movable members, and by a wedging action, will move the movable member and the lever 7 and the parts connected therewith, more or less according to the distance the sole is pushed forward between said members. It will also be seen upon listening to the muffled sounds from the exhaust, or observation of a change in the speed of the vehicle in order to know how much of an adjustment of the device he has effected. In my improved control device, the operator can at all times feel the frictional movement of his foot horizontally or vertically with respect to the inclined surfaces of the stationary and movable members so that he is apprised at all times of the fact that the movable member has been adjusted, and by this means he is enabled to secure a more accurate and nice adjustment of the controlled mechanism and with more certainty than would be otherwise possible.

In Figs. 10 and 11 I have shown a slight modification of my improved control device, in which the movable member 16, which is of substantially the same form, is provided with the upwardly inclined inner face 16$^a$ having the front part of its lower edge disposed longitudinally of the vehicle, as at 16$^b$, and being tapered or flared outwardly at its rear portion, as indicated at 16$^c$, the movable member being supported on a vertical pivot 17, provided with a guiding arm 18 adapted to be connected in any suitable manner to the valve or other device to be controlled. In this instance the stationary member indicated at 15 is formed by an upwardly inclined flange on a base plate 15$^a$ on which the movable member is mounted. A retracting spring, as indicated at 19, restores the movable member to normal position. The operation of this device will be the same as those heretofore described, the movable member swinging upon the axis of the pivot or rock shaft 17 to a greater or less extent, according to the adjustment required.

In Figs. 12 and 13 I have shown another modification of my device, in which the stationary member 25 consists merely of a vertically disposed inclined pin or stud, inclining upwardly and outwardly from a base plate 20 (or from the foot board), the base plate being provided with a slot 21 through which extends a movable member which in this instance consists of a vertically disposed arm 26, the upper end of which inclines upwardly and outwardly away from the stationary member 25. The movable member 26 is in this instance mounted upon a horizontally pivoted connection 27, and is provided with an arm 28 adapted to be connected, as by means of a link 29, with the valve or other device to be actuated, a suitable retracting spring 30 being operatively connected with the movable member to restore it to operative position.

In Figs. 14, 15, and 16, I have illustrated another slight modification of my invention in which the movable member is capable of adjustment with respect to the stationary member for the purpose of accommodating different widths of feet so as to dispense with the necessity for adjusting the stationary member and somewhat facilitate the application of the device to the floor board in certain instances. In this embodiment of my invention 35 represents the stationary member, which in this instance is permanently secured to the floor board as by means of a screw or screws 35$^a$ passing through suitable apertures in a supporting flange 35$^b$, or otherwise. The movable member 36 is on one end of a swinging arm 37, the other end of which is pivotally mounted and connected with means adapted to connect it to the part to be controlled, the connection between the movable member 36 and the control mechanism being itself adjustable so that the arm 37 can be set at different positions with respect to the stationary member to accommodate the width of the operator's foot between them. In the present instance I have shown the arm 37 provided with a downwardly extending lug adapted to be adjustably connected to a socket revolubly mounted in the floor board. In this instance the arm 37 is provided with a lug 38 having a locking tooth 38$^a$ disposed vertically thereon. A socket 39 is rotatably mounted in a suitable bearing 39$^a$ in the floor board 32, and said socket is provided with a series of vertically disposed notches 39$^b$ on its interior face, see Fig. 16. The socket is provided with arm 40$^a$ adapted to be connected by a link 41 to the valve or other control device to be operated, and said arm 40$^a$ is also provided with a retracting spring 40 normally holding the arm against a stop 40$^b$. It will be obvious that the movable member 36 can be adjusted with respect to the socket 39 and connections 40, 41 by simply lifting it vertically so as to disengage the projection 38$^a$ from the groove or notch 39$^b$ with which it is engaged at the time, and by replacing the lug 38 with the projection 38$^a$ in engagement with a different one of said grooves or notches 39$^b$.

I do not desire, however, to limit myself to this exact form of adjustable connection. It is to be understood that the stationary and movable members 35 and 36 are constructed substantially as shown in Figs. 1, 2, and 3, so as to be capable of a wedging action by the foot either vertically or horizontally.

I claim broadly a control device comprising members having opposed faces which are separated by the wedging action of the foot inserted between them in any manner, as I believe this to be entirely new with me. I prefer that one of the members should be stationary, but it is within the scope of my invention to have both members movable and to employ the movement of either one of said members or both to operate the part that when the sole is thus inserted between the members 5 and 6 to operate the device to a greater or less extent, the foot rests firmly on the floor and base plate 1 and is supported throughout its length. It will also be seen that the tension of the retracting spring 14 against the left hand side of the foot will be transmitted across the sole to the stationary member so that no stress or tension whatever of the muscles of the foot or leg is required to be exerted to resist the tension of the spring and the foot and leg muscles rest in a relaxed condition while maintaining the desired adjustment of the device. It will also be seen that an instantaneous operation of the device can be obtained by a sudden forward thrust of the foot from the position shown in full lines to the position shown in dotted lines in Fig. 4.

Fig. 5 shows diagrammatically another use of the device in which the foot is inserted between the fixed and movable members and the movable member is crowded to the left by twisting the foot, as by throwing the heel either to the left or right, as indicated by dotted lines, while maintaining the entire bottom of the foot upon the floor. In these positions also, it will be noticed that while a very fine and delicate adjustment of the movable member may be effected, the tension of the retracting spring is also transmitted across the sole to the stationary member and no stress or strain of the muscles of the foot or leg is required to maintain the adjusted position.

Fig. 6 illustrates another manner of using the device, in which the foot is inserted between the fixed and movable members and further adjustment is obtained by bodily movement of the forward portion of the foot sidewise away from the stationary member. This method of using the device may be resorted to in an emergency or where a very sudden acceleration of the motor is desired, although obviously in this case the foot would have to withstand the tension of the retracting spring.

Fig. 7 illustrates another method of using the device in which the foot is turned on one side and maintained at an angular position with one side of the sole resting on the floor against the stationary member, the opposite elevated edge of the sole resting upon the upper part of the inclined face of the movable member which is a comfortable position for the foot and may be resorted to for the purpose of temporary relief in making a long drive. In this position the movable member is operated by slightly rocking the foot and depressing the elevated edge of the same more or less against the upwardly inclined face 6ª of the movable member and exerting a wedging action between the fixed and movable member, as clearly indicated in Fig. 7, and in this case also the resistance of the retracting spring is transferred through the sole to the stationary member.

Fig. 8 represents another manner of using the device. In this instance the sole is elevated and the heel rests on the floor board in rear of the stationary and movable members, and the sole is depressed between the stationary and movable members as indicated in Fig. 8 with an outward motion. This manner of actuating the movable members produces a wedging action, as indicated in Fig. 8, between the upwardly inclined faces of the stationary and movable members, and the further the sole is depressed, the further the movable member will be moved away from the fixed member. In this use of the device, it will be noted that a partial support for the sole portion of the foot is afforded by the frictional engagement of the sole and the upwardly inclined faces of the stationary and movable members, and it will also be seen that the tension of the retracting spring is transferred across the sole to the stationary member in all the adjusted positions of the movable member. This method of operating the device also permits a quick depression of the sole portion of the foot and a quick lateral movement of the movable member for use in emergencies or where a sudden acceleration is required, as at street crossings, &c.

Fig. 9 represents another method of using the device in which the foot is inserted between the fixed and movable members so as to bring the instep portion of the foot between the same, and the foot may be twisted in either direction, as may be most convenient to effect the lateral movement of the movable member, the entire foot being in the meanwhile supported in a relaxed position by the flooring and base plate.

It will thus be seen that my improved device may be operated readily in a wide variety of ways according to the whim or convenience of the driver and under any conditions which may confront him he may secure either a quick action of the throttle or control mechanism or a very nicely graduated control as may be required, while the foot is at all times supported practically throughout its entire length in an easy position and relieved from stress or tension of the muscles and the great variety of positions which the foot may assume and still exercise effective control through this device permits the operator to frequently change his position during a long drive and secure the greatest amount of comfort without sacrificing accuracy or uniformity of control.

In most of the devices in common use the construction affords no indication to the operator that he has changed the adjustment of the device, and he is therefore dependent to be controlled. Thus, in Fig. 17 I have shown a construction in which both of the opposed members 45 and 46 are capable of movement under the wedging action of the foot, the member 46 being provided with means adapted to connect it to the part to be controlled, as indicated by the arm 47 and being provided with a retracting spring 48, while the member 45 is also movable to a slight extent and provided with a retracting spring 49, which is preferably stronger than the spring 48. In this case the actuation of the controlled device is effected by the member 46 and the slight yielding of the member 45 tends to facilitate the insertion of the foot with a wedging action between the two members, either vertically or horizontally and to prevent a too sudden operation of the controlled mechanism.

While I prefer to construct the device as indicated in Figs. 1, 2, and 3, it will be understood that my invention is capable of considerable variations in the specific details as shown, for example, in the modifications illustrated in Figs. 10 to 17, and I do not desire to be limited to the exact details of construction herein shown and described, as considerable variations may be made therein without departing from the spirit of my invention.

What I claim and desire to secure by Letters Patent is—

1. A foot operated control device for automobiles comprising a stationary and a movable member, provided with opposed faces, between which the foot is inserted, means adapted to connect said movable member to the part to be controlled, and retracting means for the movable member, whereby the movable member may be actuated by inserting the foot between the said members to a greater or less extent, and whereby the resistance of the retracting means is transferred across the foot to the stationary member.

2. A foot operated control device for automobiles comprising a stationary and a movable member provided with opposed faces, one of said faces being inclined with respect to the other, means adapted to connect said movable member to the part to be controlled, and retracting means for said movable member, whereby the foot may be inserted to a greater or less extent between the opposed faces of said members with a wedging action to hold the movable member in different adjusted positions, and the resistance of the retracting means will be transmitted across the foot to the stationary member.

3. A foot operated control device for automobiles, comprising a stationary and a movable member provided with opposed vertically disposed faces, one of said faces being vertically inclined with respect to the other, means adapted to connect the movable member to the part to be controlled, and retracting means for said movable member, whereby the foot may be moved vertically between the opposed faces of said members with a wedging action to hold the movable member in different adjusted positions, and the pressure of the retracting means will be transmitted across the foot to the stationary member.

4. A foot operated control device for automobiles, comprising a stationary and a movable member, provided with opposed vertically disposed faces, one of said faces being horizontally inclined with respect to the other, means adapted to connect the movable member to the part to be controlled, and retracting means for said movable member, whereby the foot may be moved horizontally between said members with a wedging action to hold the movable member in different adjusted positions, and the pressure of the retracting means will be transmitted across the foot to the stationary member.

5. A foot operated control device for automobiles comprising a stationary and a movable member provided with opposed vertically disposed faces, one of said faces being vertically and horizontally inclined with respect to the other, means adapted to connect said movable member to the part to be controlled, and retracting means for said movable member, whereby the foot may be inserted between the opposed faces of said members and moved vertically and horizontally with a wedging action to hold the movable member in different adjusted positions, and the pressure of the retracting means will be transmitted across the foot to the stationary member.

6. A foot operated control device for automobiles, comprising a stationary member and a movable member, having opposed vertically disposed foot engaging faces, one of said faces being inclined vertically with respect to the other and one of said faces being inclined horizontally with respect to the other, means adapted to connect said movable member to the part to be controlled, and retracting means for said movable member.

7. A foot operated control device for automobiles, comprising a stationary member and a movable member provided with opposed vertically disposed foot engaging faces, each of said faces being inclined to the other, both vertically and horizontally whereby the foot may be inserted between said members with a wedging action and moved either vertically or horizontally, to adjust said movable member, means adapted to connect said movable member with the part to be controlled, and retracting means for said movable member.

8. A foot operated control device for automobiles comprising a stationary member and a movable member, provided with opposed vertically disposed foot engaging faces, adapted to receive the foot of the operator between them, means adapted to connect said movable member to the part to be controlled, retracting means for said movable member, and means for adjusting the stationary member laterally to different positions with respect to the movable member to accommodate variations in the width of the operator's foot.

9. A foot operated control device for automobiles comprising a stationary member, a pivotally mounted movable member, said members being provided with opposed vertically disposed foot engaging faces adapted to receive the foot of the operator between them one of said faces being inclined with respect to the opposed face of the other member to permit the foot to be inserted with a wedging action, means adapted to connect the movable member to the part to be controlled, and means for laterally adjusting the stationary member toward and from the normal position of the movable member, and retracting means for said movable member.

10. A foot operated control device for automobiles comprising a stationary member, and an opposed movable member, said members having their opposed faces inclined upwardly in opposite directions away from each other, said faces having their rearward portions diverging away from each other, a pivotal support for said movable member, retracting means for said movable member, and means adapted to connect the movable member with the part to be controlled, whereby the foot may be inserted between said members with a wedging action, and moved vertically, horizontally, or torsionally, and the pressure of said retracting means will be transmitted across the foot to the said stationary member.

11. A foot operated control device for automobiles comprising a base plate, a stationary member secured to said base plate, means for adjusting the stationary member laterally, an opposed movable member, said members having their opposed faces inclined to each other, a pivotally mounted supporting arm extending through a slot in said base plate and detachably connected to the movable member, means adapted to connect the movable member with the part to be controlled, and a retracting spring for said movable member.

12. A foot operated control device for automobiles, comprising a supporting base provided with a slot at one side of the same and with a plurality of adjusting apertures at the other side, a stationary member provided with pins for engaging said adjusting apertures, a movable arm extending through said slot, a movable member carried by said arm having its inner face opposed to the inner face of the stationary member, said members having their opposed faces inclined to each other both vertically and horizontally, a retracting device for said movable arm, and means adapted to connect said movable arm with the part to be operated.

13. A foot operated control device for automobiles comprising two separable members provided with vertically disposed opposing faces adapted to receive the foot of the operator between them with a wedging action to separate said members, one of said members being movable with respect to its supporting means, means adapted to connect said movable member to the part to be controlled, and retracting means for said member.

14. A foot operated control device for automobiles comprising two members provided with opposed vertically disposed foot engaging faces adapted to receive the foot of the operator between them, one of said members being movable with respect to its supporting means, and the other member, means adapted to connect said movable member to the part to be controlled, retracting means for restoring the part to be controlled to its normal position, and means for adjusting one of said opposed members with respect to the other to accommodate variations in the width of the operator's foot.

15. A foot operated control device for automobiles comprising a stationary member and a movable member provided with opposed vertically disposed foot engaging members adapted to receive the foot of the operator between them, means for connecting a movable member to the part to be controlled, retracting means for said movable member, and means for varying the relative normal positions of said stationary and movable members to accommodate the variations in the width of the operator's foot.

In testimony whereof I affix my signature, in the presence of two witnesses.

JOHN ATKINSON STAPLES.

Witnesses:
E. BENNETT,
M. H. DOHERTY.